(12) United States Patent
Dudar (10) Patent No.: US 10,774,760 B2
(45) Date of Patent: Sep. 15, 2020

(54) SYSTEM AND METHOD FOR INTAKE AIR FILTER DIAGNOSTIC

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 15/920,347

(22) Filed: Mar. 13, 2018

(65) Prior Publication Data

US 2019/0285018 A1 Sep. 19, 2019

(51) Int. Cl.
| | |
|---|---|
| *F02D 41/22* | (2006.01) |
| *F02D 41/00* | (2006.01) |
| *F02M 35/024* | (2006.01) |
| *F02M 35/10* | (2006.01) |
| *F02B 37/16* | (2006.01) |

(52) U.S. Cl.
CPC .......... *F02D 41/0037* (2013.01); *F02B 37/16* (2013.01); *F02D 41/0002* (2013.01); *F02D 41/004* (2013.01); *F02D 41/0035* (2013.01); *F02D 41/22* (2013.01); *F02M 35/024* (2013.01); *F02M 35/1038* (2013.01); *F02D 2200/0406* (2013.01); *F02D 2200/0408* (2013.01); *F02D 2200/0602* (2013.01)

(58) Field of Classification Search
CPC .......... F02D 41/0035; F02D 41/0037
See application file for complete search history.

(56) References Cited

U.S. PATENT DOCUMENTS

| | | | |
|---|---|---|---|
| 5,606,311 A | 2/1997 | Polidan et al. | |
| 8,701,473 B2 * | 4/2014 | Uehara | B01D 46/0086 73/114.31 |
| 8,959,910 B2 * | 2/2015 | Rollinger | F02B 37/18 60/602 |
| 9,382,825 B2 | 7/2016 | Pursifull | |
| 9,643,484 B2 * | 5/2017 | Krafzig | B60W 10/06 |
| 9,664,127 B2 | 5/2017 | Dudar | |
| 9,739,244 B2 * | 8/2017 | Dudar | B60K 15/03519 |
| 10,040,448 B2 * | 8/2018 | Dudar | F02D 29/02 |
| 2012/0317974 A1 * | 12/2012 | Rollinger | F02M 35/09 60/602 |
| 2013/0036804 A1 * | 2/2013 | Uehara | F02M 35/09 73/114.31 |
| 2015/0047317 A1 | 2/2015 | Ulrey et al. | |
| 2016/0016462 A1 * | 1/2016 | Krafzig | B60W 10/08 701/22 |
| 2017/0096974 A1 * | 4/2017 | Dudar | B60W 20/00 |
| 2017/0137022 A1 * | 5/2017 | Dudar | B60W 50/14 |
| 2019/0360434 A1 * | 11/2019 | Dudar | F02D 41/2464 |
| 2019/0368431 A1 * | 12/2019 | Dudar | F02D 41/003 |

* cited by examiner

*Primary Examiner* — Kevin R Steckbauer
(74) *Attorney, Agent, or Firm* — Geoffrey Brumbaugh McCoy Russell LLP (57) ABSTRACT

Systems and methods for detecting a clogged intake air filter in a turbocharged engine system are provided. In one example a method for an engine coupled to an air filter and to a fuel tank includes indicating air filter clogging responsive to a measured fuel tank pressure during boosted engine operation. In this way, clogging of the air filter may be determined using existing engine system components.

20 Claims, 4 Drawing Sheets

SYSTEM AND METHOD FOR INTAKE AIR FILTER DIAGNOSTIC

FIELD

The present description relates generally to methods and systems for detecting clogging of an intake air filter positioned in an intake path of an engine.

BACKGROUND AND SUMMARY

Vehicles typically have an air filter that cleans outside air before the air is ingested into the engine to mix with fuel before combustion. Over time, the air filter becomes clogged with dust, dirt, and other debris, in particular if the vehicle travels on dirt roads. Symptoms of a dirty/clogged air filter may vary but often include a noticeable decrease in gas mileage. Other symptoms include potential ignition problems caused by fouled spark plugs. A dirty air filter prevents the necessary volume of clean air from reaching the engine, which affects the emission control systems of the vehicle, reducing air flow and causing a too rich air-fuel mixture which can foul the spark plugs. In addition, a too rich fuel mixture increases engine deposits.

Various approaches for diagnosing a dirty or clogged air filter have been proposed. For example, U.S. Pat. No. 5,606,311 discloses an intake air filter diagnostic routine that compares a pressure drop across the air filter to an expected pressure drop across the air filter for the given operating conditions. If the pressure drop is greater than the expected pressure drop, the air filter is determined to be clogged and an operator of the vehicle is notified.

However, the inventor herein has recognized an issue with the above approach. Monitoring the pressure drop across the air filter typically requires additional components, such as additional pressure sensors. In the example presented above, for example, the air filter is equipped with a switch assembly including two pressure switches each configured to switch states when a pressure difference acting on a flexible diaphragm of the switch assembly is above a respective threshold. The inclusion of such additional components increases the cost of the vehicle. Further, in boosted engine systems, the intake air pressure downstream of the air filter may not correlate with the intake manifold pressure. Thus, the pressure measurements provided by the existing intake manifold pressure sensor may not be useful in determining the pressure drop across the air filter.

Accordingly, the inventor herein has proposed an approach to at least partly address the above issues. In an example, a method for an engine coupled to an air filter and to a fuel tank includes indicating air filter clogging responsive to a measured fuel tank pressure during boosted engine operation. In this way, the existing fuel tank pressure sensor may be repurposed during boosted engine operation to detect air filter clogging. During boosted engine operation, vacuum may be generated between the air filter and an inlet of a compressor positioned downstream of the air filter, and the amount of vacuum produced depends on the level of clogging of the air filter (e.g., a clogged air filter will result in more vacuum being generated). The fuel tank pressure sensor may be fluidically coupled to the intake passage downstream of the air filter via a fuel vapor canister purge conduit during the boosted engine operation to expose the fuel tank pressure sensor to the vacuum downstream of the air filter. If the vacuum is greater than a threshold, for example, air filter clogging may be indicated and an operator may be notified to clear or replace the air filter. In doing so, a clogged air filter may be detected using existing vehicle components during normal engine operation, allowing the air filter to be replaced, if indicated, before a regularly scheduled maintenance of the vehicle, thereby improving fuel economy and reducing spark plug fouling.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
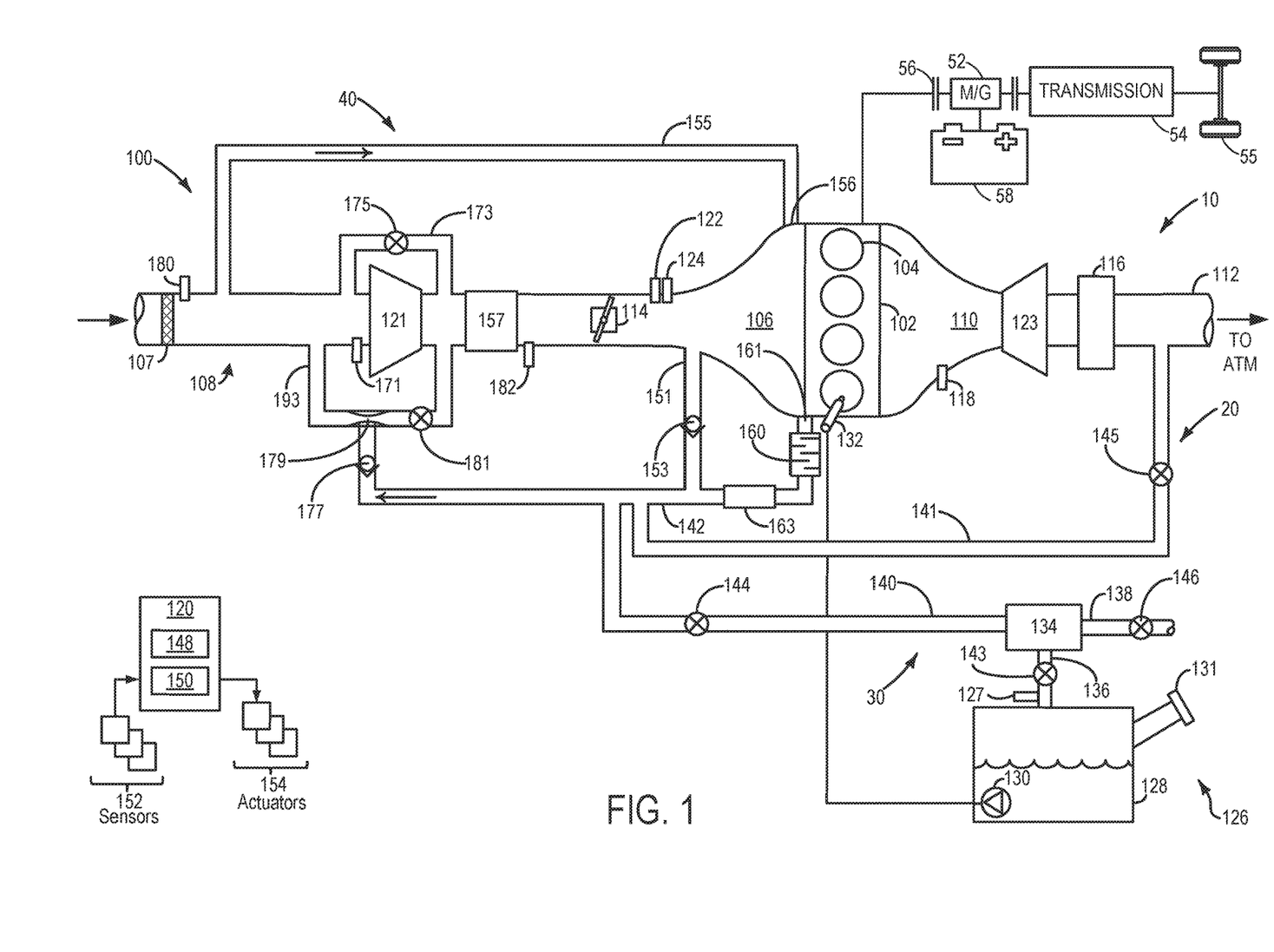
FIG. 1 shows an example turbocharged engine system.

The present description relates to systems and methods for detecting clogging of an intake air filter of an engine system, such as the engine system illustrated in FIG. 1. Over time, intake air filters may become clogged with dirt and other debris. A clogged air filter may reduce the volume of fresh air that may be ingested by the engine, resulting in degraded fuel economy and fouled spark plugs, for example. To detect a clogged air filter, the present disclosure includes a diagnostic test, such as the diagnostic test illustrated in FIG. 3, that may be performed during boosted engine operation, when vacuum develops between the air filter and a downstream compressor inlet, such as during the conditions illustrated by the method of FIG. 2. This vacuum may be measured by a fuel tank pressure sensor, which is typically included on the fuel tank or in a conduit between the fuel tank and a fuel vapor canister to ensure that fuel tank pressure (resulting from the build-up of fuel vapors in the fuel tank) does not exceed a predefined limit. To expose the fuel tank pressure sensor to the vacuum downstream of the air filter, the fuel tank pressure sensor may be fluidically coupled to the intake passage downstream of the air filter via an evaporative emission control system that includes the fuel vapor canister, a purge conduit, a purge valve, and a boosted operation vacuum source.

The evaporative emission control system includes the fuel vapor canister, which traps fuel vapors generated in the fuel tank to prevent the vapors from being released to atmosphere. During engine operation, the stored fuel vapors in the canister are directed to the engine for combustion, referred to as fuel vapor canister purge. Boosted engine systems may operate with a pressurized intake manifold during various operating conditions, removing the source of vacuum (e.g., intake manifold vacuum) typically relied on for purging the fuel vapor canister. Thus, boosted engine systems may include a boosted operation vacuum source that draws vacuum during boosted operation and applies the drawn vacuum to purge the fuel vapor canister. This boosted operation vacuum source may include an ejector positioned in a bypass passage coupled across the compressor, resulting in a fluidic coupling between the intake passage downstream of the air filter and the fuel tank pressure sensor via the ejector. To apply the vacuum generated between the air filter and compressor to the fuel tank pressure sensor, the purge valve may be opened and an ejector flow control valve positioned in the bypass passage may be closed to prevent recirculation of boosted air through the bypass passage, as shown by the timing diagram of FIG. 4.

FIG. 1 schematically shows an example of an engine system 100. Engine system 100 may be included in a vehicle system in order to at least partially assist in propulsion of the vehicle system. For example, engine system 100 may be included in a suitable hybrid vehicle system, e.g., a hybrid electric vehicle (HEV), which includes additional vehicle propulsion systems, e.g., motors, or may be included in a non-HEV vehicle that does not include a motor and is merely powered by an internal combustion engine.

The engine system 100 includes an engine 10 with an engine block 102 having a plurality of cylinders 104. The cylinders 104 may receive intake air from an intake manifold 106 via an intake passage 108 and may exhaust combustion gases to an exhaust manifold 110 and further to the atmosphere via exhaust passage 112. The intake air received in the intake passage 108 may be cleaned upon passage through an intake air filter 107.

The engine may include at least one turbocharger including a compressor 121 and a turbine 123. Compressor 121 is coupled to intake passage 108 and is driven by turbine 123 coupled to exhaust passage 112. Compressor 121 compresses air in intake passage 108 for delivery to intake manifold 106. In some examples, engine system 100 may include a compressor bypass conduit 173 coupled to the intake 108 upstream and downstream of compressor 121. Compressor bypass conduit 173 may include a compressor bypass valve 175 configured to adjust an amount of air flow bypassing compressor 121. Further, intake 108 may include a charge air cooler (CAC) 157 in intake 108 downstream of compressor 121. Charge air cooler 157 may be configured to reduce a temperature of compressed air exiting compressor 121 before delivery to intake manifold 106. The intake passage 108 may include a compressor inlet pressure sensor 171 located upstream of compressor 121. Further, in some examples, an additional pressure sensor 182 may be located in intake passage 108 downstream of compressor 121.

An intake throttle 114 is positioned downstream of the compressor 121. The intake throttle 114 may be configured to alter the amount of air provided to the intake manifold 106. In this particular example, the position of the throttle 114 may be varied by a controller 120 via a signal provided to an electric motor or actuator included with the throttle 114, a configuration that is commonly referred to as electronic throttle control (ETC). In this manner, the throttle 114 may be operated to vary the intake air provided to the plurality of cylinders 104. The intake passage 108 may include a mass air flow sensor 122 and a manifold air pressure sensor 124 for providing respective signals MAF and MAP to the controller 120. The mass air flow sensor 122 and the manifold air pressure sensor 124 may be positioned in the intake passage 108 downstream of intake throttle 114, in some examples.

An emission control device 116 is shown arranged along the exhaust passage 112. In some examples, emission control device 116 may be located in exhaust passage 112 downstream of turbine 123. The emission control device 116 may be a three way catalyst (TWC), NOx trap, various other emission control devices, or combinations thereof. In some embodiments, during operation of the engine system 100, the emission control device 116 may be periodically reset by operating at least one cylinder of the engine within a particular air/fuel ratio. An exhaust gas sensor 118 is shown coupled to the exhaust passage 112 upstream of the emission control device 116. The sensor 118 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. It will be appreciated that the engine system 100 is shown in simplified form and may include other components.

A fuel injector 132 is shown coupled directly to the cylinder 104 for injecting fuel directly therein in proportion to a pulse width of a signal received from the controller 120. In this manner, the fuel injector 132 provides what is known as direct injection of fuel into the cylinder 104. The fuel injector may be mounted in the side of the combustion chamber or in the top of the combustion chamber, for example. Fuel may be delivered to the fuel injector 132 by a fuel system 126. In some embodiments, cylinder 104 may alternatively or additionally include a fuel injector arranged in intake manifold 106 in a configuration that provides what is known as port injection of fuel into the intake port upstream of the cylinder 104.

The fuel system 126 includes a fuel tank 128 coupled to a fuel pump system 130. A refueling pipe and fuel cap 131 are coupled to fuel tank 128 for replenishing fuel in the tank. The fuel pump system 130 may include one or more pumps for pressurizing fuel delivered to the injectors 132 of the engine system 100, such as the fuel injector 132. While only a single injector 132 is shown, additional injectors are provided for each cylinder. It will be appreciated that fuel system 126 may be a return-less fuel system, a return fuel system, or various other types of fuel system.

The engine system 100 may include a plurality of gas discharge sources wherein gas from the gas discharge source is directed to intake passage 108. For example, the engine system 100 may direct a variety of gas streams to an intake system of the engine 10 such as an evaporative emissions system 30, exhaust gas recirculation (EGR) system 20, and/or crankcase ventilation system 40. As described above, in approaches which rely on engine intake manifold vacuum to drive gas circulation through the aforementioned systems, the gas flow rate through such systems may disadvantageously vary based on the air flow rates in the intake passage 108. In order to provide a consistent flow rate through such systems under all engine operating conditions, a vacuum source 179 may be provided in intake passage 108 so that gas delivery rates from the crankcase ventilation system 40, emission control system 30, and EGR system 20 may be delivered in proportion to engine air flow rate during different engine operating conditions.

During certain conditions, vacuum may be generated at the vacuum source 179 to draw gas flow through evaporative emissions system 30, exhaust gas recirculation (EGR) system 20, and/or crankcase ventilation system 40. For example, crankcase ventilation system 40 includes a crankcase inlet conduit 155 coupled to intake passage 108 upstream of an inlet 156 of a sealed crankcase of engine 10. Crankcase ventilation system 40 further includes a crankcase outlet conduit 142 coupled to an outlet 161 of the sealed crankcase of engine 10. A check valve 177 may be included in conduit 142 so that crankcase ventilation gases are driven by vacuum provided at vacuum source 179 uni-directionally through the crankcase ventilation system 40 in a direction from upstream of compressor 121 to the intake passage. Crankcase ventilation system 40 may further include an oil separator 160 located in conduit 142 adjacent to outlet 161. Since the gas flow through the crankcase ventilation system is uni-directional, the crankcase ventilation system may only include a single oil separator 160.

In some examples, crankcase outlet conduit 142 may additionally be coupled, via conduit 151, to intake passage 108 at a location downstream of intake throttle 114 so that during certain conditions, vacuum from intake manifold 106 may be used in addition to vacuum generated at vacuum source 179, to pull crankcase gases through the crankcase ventilation system into intake manifold 106. Conduit 151 may additionally include a one-way check valve 153 to provide uni-directional flow through the crankcase ventilation system 40.

Further, in some examples, crankcase ventilation system 40 may include a flow limiting device 163 disposed in conduit 142. For example, flow limiting device 163 may be a sonic choke configured to restrict the amount of flow in the discharge outlet 161 of the crankcase ventilation system in response to an amount of flow in the crankcase ventilation system greater than a threshold amount.

The engine system may further include an emission control system 30 including a fuel vapor canister 134. Vapors generated in the fuel system 126 may be directed to an inlet of fuel vapor canister 134 via a vapor recovery line 136. The fuel vapor canister may be filled with an appropriate adsorbent to temporarily trap fuel vapors (including vaporized hydrocarbons) during fuel tank refilling operations and "running loss" (that is, fuel vaporized during vehicle operation). In one example, the adsorbent used is activated charcoal. However, other adsorbents have been contemplated.

In examples where engine system 100 is coupled in a hybrid vehicle system, the engine may have reduced operation times due to the vehicle being powered by engine system 100 during some conditions, and by a system energy storage device or motor under other conditions. While the reduced engine operation time reduces overall carbon emissions from the vehicle, it may also lead to a decrease in purging of fuel vapors from the vehicle's emission control system. To address this, a fuel tank isolation valve 143 may be optionally included in vapor recovery line 136 such that fuel tank 128 is coupled to canister 134 via the isolation valve 143. During regular engine operation, isolation valve 143 may be kept closed to limit the amount of diurnal or "running loss" vapors directed to canister 134 from fuel tank 128. During refueling operations, and selected purging conditions, isolation valve 143 may be temporarily opened, e.g., for a duration, to direct fuel vapors from the fuel tank 128 to canister 134. By opening the valve during conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 143 positioned along vapor recovery line 136, in alternate examples, the isolation valve may be mounted on fuel tank 128. The fuel vapor canister 134 may be fluidly coupled to a vent line 138 which includes a vent valve 146. Under some conditions, the vent line 138 may route gases out of the fuel vapor canister 134 to the atmosphere, such as when storing, or trapping, fuel vapors of the fuel system 126. The fuel vapor canister is coupled to intake passage 108 via a purge conduit 140 including a purge valve 144. For example, during a fuel vapor purging event, vacuum generated at vacuum source 179 may be used to purge the canister 134 so that fuel vapors stored in canister 134 are delivered to intake passage 108.

The vent line 138 may allow fresh air to be drawn into the fuel vapor canister 134 when purging stored fuel vapors of the fuel vapor canister to the intake manifold 106 via the purge line 140. In particular, the vent valve 146 may be opened so that fresh air may be drawn into the canister via vent line 138 and vacuum generated at vacuum source 179 may be used to draw fuel vapors from the canister 134 into intake passage 108. Purge valve 144 may be adjusted to control a purge flow rate delivered to engine 10. In some examples, the purge conduit 140 may be coupled to conduit 142 so that vacuum generated at vacuum source 179 may be provided to emission control system 30 in addition to crankcase ventilation system 40.

Engine system 100 may also include an exhaust gas recirculation (EGR) system 20. EGR system 20 includes an EGR conduit 141 in fluidic communication with the intake passage 108 and the exhaust manifold 110. EGR conduit 141 includes an EGR valve 145 configured to control an amount of exhaust gas flowing through conduit 141. Further, EGR conduit 141 may also be coupled to vacuum source 179 to that vacuum generated at vacuum source 179 may be used to drive gas through EGR system 20. For example, EGR conduit 141 may also be coupled to conduit 142 so that vacuum generated at vacuum source 179 may be provided to EGR system 20 in addition to emission control system 30 and crankcase ventilation system 40. In some examples, the EGR conduit 141 may be coupled to exhaust conduit 112 downstream of turbine 123 and emission control device 116. However, in other examples, EGR conduit 141 may be coupled to exhaust passage 112 upstream of turbine 123 and/or upstream of emission control device 116. The EGR in conduit 141 may be cooled along its path.

The controller 120 is shown in FIG. 1 as a microcomputer, including microprocessor unit 148, input/output ports, a computer readable storage medium 150 for executable programs and calibration values (e.g., read only memory chip, random access memory, keep alive memory, etc.) and a data bus. Storage medium read-only memory 150 can be programmed with computer readable data representing instructions executable by the processor 148 for performing the methods described below as well as other variants that are anticipated but not specifically listed.

The controller 120 may receive information from a plurality of sensors 152 of the engine system 100 that correspond to measurements such as inducted mass air flow, engine coolant temperature, ambient temperature, engine speed, throttle position, manifold absolute pressure signal, compressor inlet pressure, intake volume pressure signal, an intake passage pressure signal, air/fuel ratio, fuel fraction of intake air, intake volume pressure, fuel tank pressure from fuel tank pressure transducer 127, fuel canister pressure, etc. Note that various combinations of sensors may be used to produce these and other measurements. The sensors 152 may include a pressure sensor 180 positioned downstream of air filter 107, a pressure sensor 171 positioned upstream of compressor 121, a pressure sensor 182 positioned downstream of compressor 121, and the pressure sensor 124. Furthermore, the controller 120 may control a plurality of actuators 154 of the engine system 100 based on the signals from the plurality of sensors 152. Examples of actuators 154 may include the intake throttle 114, the fuel injector 132, compressor bypass valve 175, EGR valve 145, purge valve 144, and valve 181.

Vacuum source 179 comprises an ejector or venturi located within a compressor bypass passage 193 coupled to intake passage 108 upstream and downstream of compressor 121. In this example, bypass passage 193 may include a valve 181 for controlling an amount of air flow through passage 193. The vacuum source 179 comprises an ejector disposed within bypass passage 193 and may be positioned upstream of valve 181 (as shown) or downstream of valve 181. In this example, the gas discharge sources are coupled to a low pressure region of ejector 179, e.g., via conduit 142. In some examples, bypass conduit 193 may be the same as compressor bypass conduit 173. However, in other examples, bypass passage 193 including vacuum source 179 may be an additional bypass passage different from bypass conduit 173.

As remarked above, valve 181 may be configured to control an amount of air flow through ejector 179. For example, during engine operating conditions when an amount of vacuum in intake manifold 106 is sufficient to drive gas flow through the crankcase ventilation system 40, the emission control system 30, and the EGR system 20, e.g., when an air flow rate in the intake passage is less than a threshold amount, then valve 181 may be closed or adjusted to decrease flow through ejector 179. However, during engine operating conditions when an amount of vacuum in intake manifold 106 is not sufficient to drive gas flow through the crankcase ventilation system 40, the emission control system 30, and the EGR system 20, e.g., when an air flow rate in the intake passage is greater than a threshold amount and/or when an opening amount of intake throttle 114 is greater than a threshold amount, then an opening amount of valve 181 may be increased to increase an amount of air flowing through ejector 179 so that an increased vacuum is available to the crankcase ventilation system 40, the emission control system 30, and the EGR system 20.

Thus, bypass passage 193 is coupled across compressor 121, with an inlet of the bypass passage being coupled to the intake passage between an outlet of the compressor and charge air cooler 157 and an outlet of the bypass passage being coupled to the intake passage between the air filter and the inlet of the compressor. During boosted engine operation, when vacuum generation via the ejector is desired, valve 181 may be opened to allow compressed intake air from the compressor outlet to recirculate through the bypass passage, from the inlet to the outlet. The compressed intake air flows through the ejector, acting as the motive fluid that draws in gases from conduit 142. During a fuel vapor canister purge while the engine is operating in the boosted mode (e.g., when a load on the canister exceeds a purge load), the purge valve 144 (and canister vent valve 146) are opened to draw fresh air through the fuel vapor canister 134, stripping fuel from the fuel vapor canister, and sending the fuel vapors/fresh air mix to the engine via conduit 142.

During non-boosted engine operation when the load on the canister exceeds a purge load, purging of the fuel vapor canister may occur via a direct route to the intake manifold, such as through conduit 151 and check valve 153, with the valve 181 closed to reduce pumping losses.

During boosted engine operation where diagnosing of the intake air filter is desired, the boosted purge pathway may be utilized so that the fuel tank pressure transducer 127 may be exposed to vacuum that develops between the air filter and the compressor during boosted engine operation. Thus, during boosted engine operation when an air filter diagnostic test is commanded (and when other entry conditions are met, such as the load on the fuel vapor canister being below a diagnostic load, which may be lower than the purge load), the valve 181 may be closed to block recirculation of compressed intake air through bypass passage 193. The purge valve 144 may be opened and the vent valve 146 may be closed to fluidically couple the air filter to the fuel tank pressure transducer (FTIV 143 may be opened as well). As a vacuum develops between the air filter and compressor, the vacuum draws in vapors/gases from the fuel tank, fuel vapor canister, and associated conduits (e.g., conduit 142) to the intake passage, via the secondary flow/suction inlet of the ejector and through the outlet of the bypass passage.

In some examples, the vehicle in which engine system 100 is installed may be a hybrid vehicle with multiple sources of torque available to one or more vehicle wheels 55. In other examples, the vehicle is a conventional vehicle with only an engine, or an electric vehicle with only electric machine(s). In the example shown, the vehicle includes engine 10 and an electric machine 52. Electric machine 52 may be a motor or a motor/generator. A crankshaft of engine 10 and electric machine 52 are connected via a transmission 54 to vehicle wheels 55 when one or more clutches 56 are engaged. In the depicted example, a first clutch 56 is provided between the crankshaft of engine 10 and electric machine 52, and a second clutch 56 is provided between electric machine 52 and transmission 54. Controller 120 may send a signal to an actuator of each clutch 56 to engage or disengage the clutch, so as to connect or disconnect the crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Figure 2:
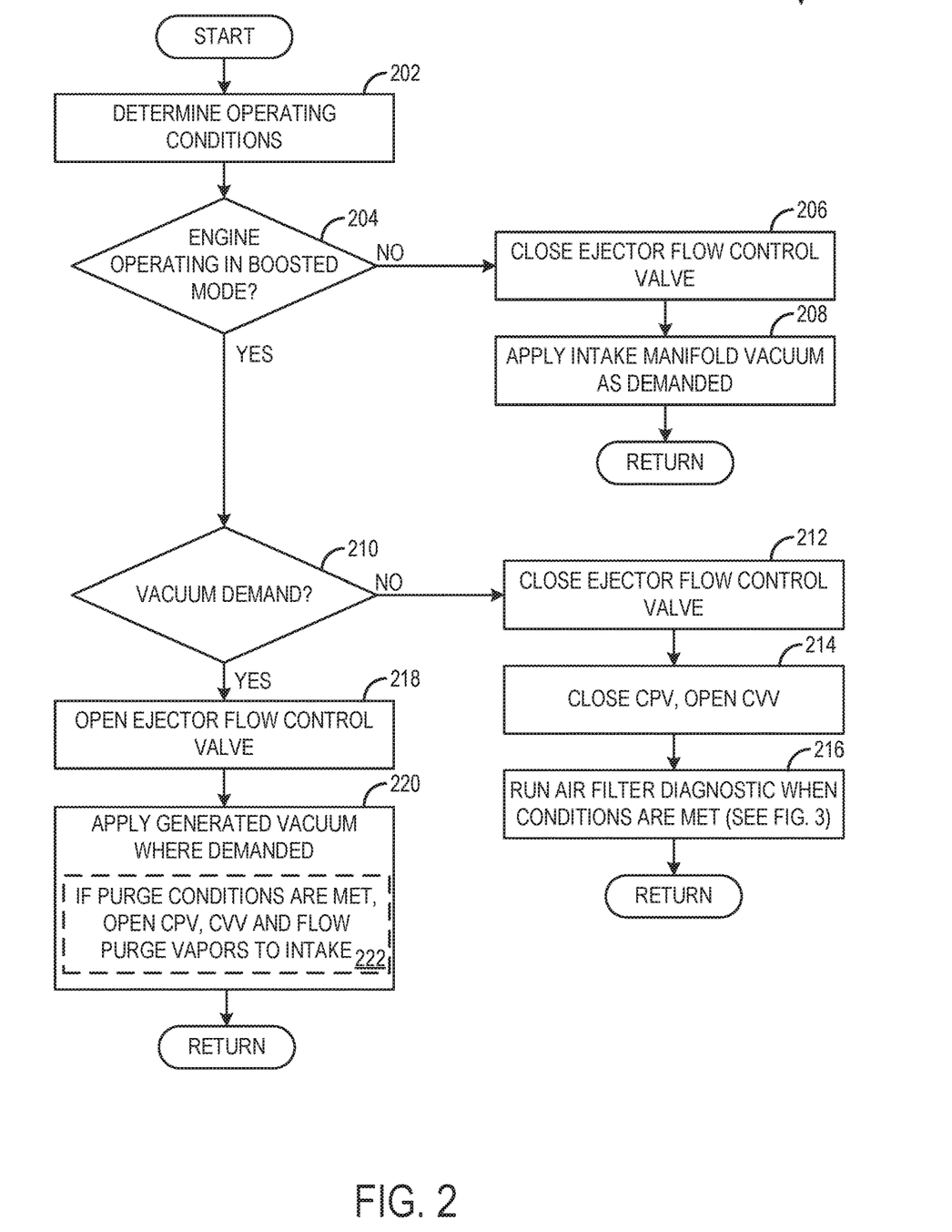
FIG. 2 is a flow chart illustrating an example method for operating a turbocharged engine system.

FIG. 2 shows an example method 200 for operating a turbocharged engine to provide vacuum to drive flow through one or more of a crankcase ventilation system, an emission control system, and an exhaust gas recirculation (EGR) system included in an engine system. As shown in FIG. 1 described above, an engine system may include a vacuum source 179 used to provide consistent vacuum throughout engine operation to one or more of a crankcase ventilation system, an evaporative emission control system, and an exhaust gas recirculation (EGR) system. Instructions for carrying out method 200 and the rest of the methods included herein may be executed by a controller (e.g., controller 120) based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, method 200 includes determining engine operating parameters. The determined engine operating parameters may include, but are not limited to, engine status (operating or off), engine load, engine speed, demanded boost pressure, fuel vapor canister load, and other conditions. At 204, method 200 includes determining if the engine is currently operating in boosted engine mode. During conditions of low engine torque demand, for example during idle or other low engine speed and load conditions, the engine may operate without boosted intake air (e.g., intake manifold pressure may be at or below ambient pressure). During higher engine torque demand, the compressor in the intake (e.g., compressor 121 of FIG. 1) may compress the intake air, delivering intake air to the intake manifold at a pressure that is greater than ambient pressure. To determine if the engine is current operating in the boosted mode, intake manifold pressure (e.g., measured by sensor 124 of FIG. 1) may be determined and compared to ambient pressure, or another suitable determination may be performed.

If the engine is not operating in the boosted mode (e.g., if intake manifold pressure is equal to or less than ambient pressure), method 200 proceeds to 206 to close an ejector flow control valve. The ejector flow control valve may control flow of intake air through an ejector positioned in a bypass passage around the compressor, such as valve 181 of FIG. 1 (which controls flow of air through ejector 179 positioned in bypass passage 193). By closing the ejector flow control valve, pumping losses associated with flowing air through the bypass passage during non-boosted engine operation may be avoided. Because the intake manifold is operating at vacuum, any vacuum consumers demanding vacuum may be supplied vacuum from the intake manifold, as indicated at 208. The vacuum consumers may include the evaporative emissions control system (e.g., vacuum may be applied to purge the fuel vapor canister) and/or other consumers. Method 200 then returns.

Returning to 204, if it is determined that the engine is operating in the boosted mode, method 200 proceeds to 210 to determine if vacuum generation via the bypass passage ejector is currently being demanded. As explained above with respect to FIG. 1, the bypass passage ejector (e.g., ejector 179) may generate vacuum during boosted engine conditions when intake manifold vacuum is unavailable. The bypass passage ejector may be configured to supply vacuum to one or more of the evaporative emissions control system (also referred to herein as the evap system), the EGR system, and the positive crankcase ventilation (PCV) system. Determining if vacuum is being demanded may include determining if EGR is enabled (and, in some examples, also if exhaust pressure is less than intake manifold pressure), if purging of crankcase vapors via the PCV system is commanded, and/or if purge of the fuel vapor canister is commanded. If none of the EGR, PCV, or evap system is demanding vacuum, method 200 proceeds to 212 to close the ejector flow control valve (or maintain the valve closed if already closed), to avoid pumping losses through the bypass passage. At 214, method 200 includes closing the canister purge valve (CPV) such as purge valve 144, and opening the canister vent valve (CVV), such as vent valve 146, of the evap system (or the method may maintain the CPV closed and the CVV open if the valves are already closed and open, respectively). Because vacuum is not demanded, a purge of the fuel vapor canister is not currently being performed. Thus, the CPV may be maintained closed to prevent any vapors from the canister from being admitted to the engine and the CVV may be maintained open to allow any vapors (stripped of fuel) from the canister to be pushed to atmosphere. At 216, method 200 includes running an air filter diagnostic test when diagnostic conditions are met. The air filter diagnostic test determines whether the air filter positioned in the intake upstream of the compressor is clogged by applying vacuum generated between the air filter and the compressor to the evap system in order to measure the vacuum via the fuel tank pressure sensor. Additional details regarding the air filter diagnostic test are presented below with respect to FIG. 3.

Returning to 210, if one or more of the EGR, PCV, or evap system is demanding vacuum, method 200 proceeds to 218 to open the ejector flow control valve, thereby allowing compressed intake air to recirculate through the bypass passage and to be drawn through the ejector in the bypass passage around the compressor. The ejector then generates vacuum that may be applied to one or more of the EGR, PCV, or evap system. Thus, as indicated at 220, method 200 includes applying generated vacuum where the vacuum is demanded. For example, the vacuum generated at ejector 179 may be drawn, e.g., via conduit 142, and applied to a discharge outlet of a uni-directional crankcase ventilation system, where an inlet of the crankcase ventilation system is coupled to the intake of the engine at a position upstream of the compressor. Additionally or alternatively, the vacuum generated at ejector 179 may be drawn, e.g., via conduit 142, and applied to an exhaust gas recirculation conduit to draw engine exhaust gas into an intake manifold of the engine while continuing to apply the drawn vacuum to the discharge outlet of the crankcase ventilation system.

Applying vacuum may include, as indicated at 222, if purge conditions are met, opening the CPV and the CVV, and flowing purge vapors (e.g., ambient air and fuel vapor stripped from the fuel vapor canister) to the intake and to the engine for combustion. Purge conditions being met may include the load on the fuel vapor canister being above a threshold load, such as the canister being at maximum load (e.g., where the adsorbent of the canister is fully loaded and cannot store additional hydrocarbons). By opening the CPV and CVV, the vacuum generated at the ejector in the bypass path draws in (e.g., via conduit 142) ambient air through the CVV and the fuel vapor canister. The fresh air strips the stored hydrocarbons from the fuel vapor canister. The vacuum then draws the fresh air/fuel vapor mix to the intake passage and eventually to the engine. Further, in some examples, an opening amount of the ejector flow control valve in the bypass conduit, e.g., valve 181, may be increased in response to an increase in an amount of air flowing in the engine intake. Additionally, the CPV (e.g., purge valve 144 of FIG. 1) may be adjusted to restrict the amount of flow in the purge conduit coupling the canister to the ejector (e.g., conduit 140 which couples canister 134 to conduit 142 and ejector 179). Method 200 then returns.

Figure 3:
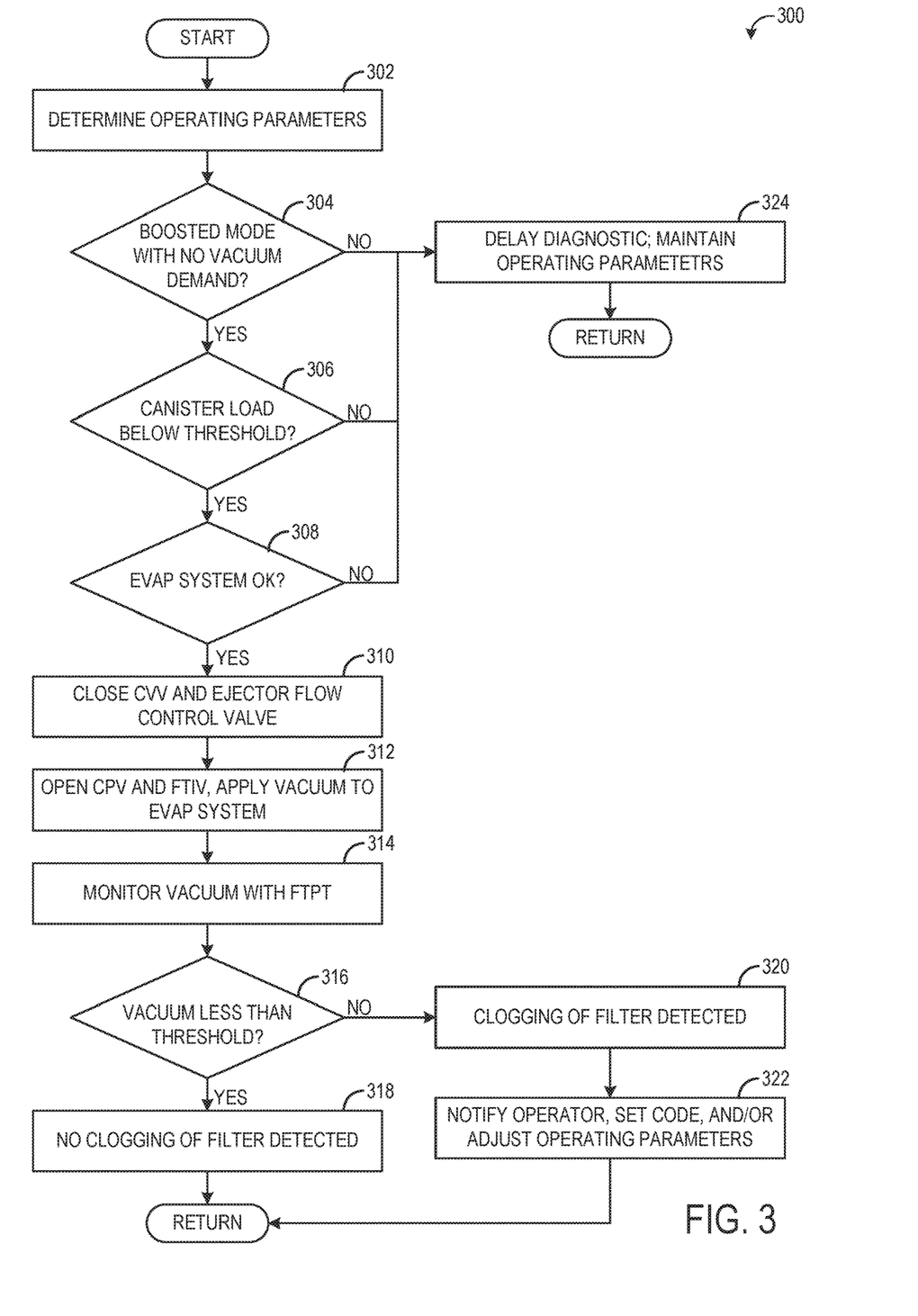
FIG. 3 is a flow chart illustrating an example method for performing an intake air filter diagnostic test.

FIG. 3 illustrates a method 300 for performing an intake air filter diagnostic test. Method 300 may be performed as part of method 200, e.g., upon determining that the engine is operating in boosted mode with no vacuum from the vacuum consumers coupled to the bypass passage ejector currently being demanded. At 302, method 300 includes determining operating parameters. The determined operating parameters may include boost level, fuel vapor canister load, most recent evap system leak test result, and/or other parameters. At 304, method 300 includes determining if the engine is operating in boosted mode with no vacuum demand (for the vacuum consumers coupled the bypass passage ejector, e.g., the EGR system, the PCV system, and the evap system). In some examples, the diagnostic test may only be performed if the engine is operating within a threshold boost pressure range. For example, at low boost (<2 InHG), insufficient vacuum may be drawn to perform the diagnostic test. Hence, a robust boost magnitude may be present before the test is performed to ensure that the diagnostic results are accurate. To ensure further consistency, the diagnostic test may be performed during a medium boost pressure magnitude range (3-6 InHG). Very high boost pressures may result in false positive determinations of a clogged air filter, as higher than normal vacuum is generated inside the system that mimics a clogged air filter. If the engine is now operating in the non-boosted mode (of if boost is outside a threshold boost range) and/or if vacuum is currently demanded by a vacuum consumer, method 300 may proceed to 324 to delay performing the intake air filter diagnostic until entry conditions are met and maintain the current operating parameters.

If the engine is operating in the boosted mode with no vacuum demand, method 300 proceeds to 306 to determine if the fuel vapor canister load is below a threshold load. The threshold canister load may be any load, such that the fuel vapor canister may be below the threshold load only when the fuel vapor canister is not storing any hydrocarbons. For example, immediately following a fuel vapor purge, the fuel vapor canister may be empty (e.g., of hydrocarbons), and thus may be below the threshold load. In some engine configurations, the fuel vapor canister may be isolated from the fuel tank during all conditions other than refueling (e.g., via a fuel tank isolation valve), and thus the fuel vapor canister may remain unloaded for extended periods of time following fuel vapor purge. In other examples, the threshold load may include a small amount of hydrocarbons being stored in the canister, such as the canister being loaded at 10% of capacity or lower.

If the fuel vapor canister is not below the threshold load, for example if the fuel vapor canister is storing some hydrocarbons, method 300 proceeds to 324 to delay the diagnostic test and maintain current operating parameters. The diagnostic test may be delayed when the fuel vapor canister is storing hydrocarbons due to potential issues that may be caused by the admission of fuel vapors from the canister into the intake system during some conditions. The path for fuel vapors into the combustion chambers may be relatively long and/or arduous when evacuating the fuel vapors from the canister through the ejector, which may result in a few seconds propagation delay time. As a result, if the diagnostic test is initiated with a fully loaded canister and then an engine stop occurs (e.g., an idle stop where the engine is automatically stopped while the vehicle is stopped a traffic light, for example), considerable amounts of fuel vapor may be trapped in the intake system. At the next engine start, the start may be long or hesitant due to the rich condition of the intake system. Similarly, the diagnostic test may be delayed or aborted when the controller determines the vehicle is operating in an urban/city drive cycle (e.g., with frequent stops and starts) or when the controller determines the vehicle may be approaching an engine shutoff condition (e.g., destination arrival).

If the fuel vapor canister load is below the threshold load, method 300 proceeds to 308 to determine if the evap system is functional enough to perform the diagnostic. Specifically, method 300 may determine if the evap system is leak-free, based on the results of a prior evap system leak test. An evap system leak test may execute periodically to assess if a leak is present in the evap system (e.g., in the fuel tank, purge conduit, etc.). If a leak is present, the evap system is not deemed functional enough to conduct the intake air filter diagnostic test, as the leak may prevent sufficient vacuum from building. The determination of the evap system being functional may also include determining that any check valves in the evap system and bypass passage are working and that the ejector is functional.

If the evap system is determined not to be functional, method 300 proceeds to 324 to delay the performance of the intake air filter diagnostic test and maintain current operating parameters. If the evap system is determined to be functional, method 300 proceeds to 310 to close the CVV and close the ejector flow control valve. By closing the CVV and the ejector flow control valve, vacuum generated between the intake air filter and the compressor inlet may be applied to the evap system (rather than atmosphere if the CVV were left open) via the ejector in the bypass passage, and boosted air is prevented from flowing through the bypass passage via the closed ejector flow control valve. At 312, method 300 includes opening the CPV and (if present) the fuel tank isolation valve (FTIV) in order to apply vacuum to the evap system. By opening the CPV, a fluidic coupling between the fuel vapor canister and other downstream evap system components is established, thereby allowing the vacuum from the intake between the air filter and compressor to be applied to the evap system, including to the fuel tank pressure sensor (also referred to as the fuel tank pressure transducer, or FTPT). In engine configurations where a FTIV is coupled between the fuel vapor canister and the FTPT (such as in the configuration of the engine system of FIG. 1, where FTIV 143 is coupled between FTPT 127 and canister 134), the FTIV may be opened so that the FTPT is able to measure the vacuum being applied to the evap system. Further, because the drawing in of fuel vapors from the fuel tank could confound the results of the diagnostic test and/or cause a too-rich condition in the intake system during some conditions, in systems where the FTIV is coupled between the fuel vapor canister and the FTPT, the diagnostic test may only be performed following evacuation of fuel vapors from the fuel tank (e.g., once it has been confirmed that the fuel tank is not currently storing fuel vapors).

At 314, method 300 includes monitoring the vacuum generated between the intake air filter and the compressor with the FTPT. For example, the output from the FTPT may be sampled in order to determine a rate of change of the fuel tank pressure upon opening the CPV and/or to determine a peak or greatest amount of vacuum sensed at the FTPT.

At 316, method 300 includes determining if the vacuum measured by the FTPT is less than a threshold vacuum. The vacuum measured by the FTPT may include a largest amount of vacuum measured by the FTPT following opening of the CPV (e.g., a peak vacuum). The threshold vacuum may be based on a vacuum generated between the intake air filter and compressor inlet when the intake air filter is fresh (e.g., newly installed). For example, the vacuum may be measured during vehicle manufacture and/or after a service event where the intake air filter is replaced, in order to determine a fresh air filter vacuum amount. The threshold vacuum may be based on this fresh air filter vacuum amount. For example, the threshold vacuum may be a value above the fresh air filter vacuum amount, such as twice the fresh air filter vacuum amount, 50% greater than the fresh air filter vacuum amount, or other suitable amount that indicates the intake air filter is clogged. In one example, a fresh intake air filter may result in a vacuum of −0.1 psi while a clogged intake air filter may result in a vacuum of −0.3 psi. In such an example, the threshold vacuum that is indicative of a clogged air filter may be −0.2 psi (e.g., twice the vacuum of the fresh air filter). In other examples, rather than compare the peak or other absolute amount of vacuum, the rate of vacuum generation upon opening the CPV may be compared to a threshold rate.

If it is determined that the vacuum is less than the threshold vacuum, for example if the threshold vacuum is −0.2 psi and the measured vacuum is −0.1 psi, method 300 proceeds to 318 to indicate that no clogging of the air filter is detected (the vacuum relative to the threshold may be based on absolute amounts of vacuum when vacuum is measured as negative pressure). Method 300 then returns.

If the vacuum is not less than the threshold, for example if the threshold vacuum is −0.2 psi and the measured vacuum is −0.3 psi, method 300 proceeds to 320 to indicate that the air filter is clogged. At 322, method 300 includes notifying an operator and/or setting a diagnostic code indicative of the clogged air filter. For example, a malfunction indicator lamp (MIL) may be lit to notify the operator of the vehicle that the air filter is clogged and thus should be replaced. Further, in some examples, one or more engine operating parameters may be adjusted in response to determining that the air filter is clogged. For example, a maximum engine air flow amount or torque may be lowered. As explained previously, a clogged air filter may reduce the volume of air ingested by the engine, leading to overly rich air-fuel ratios that may compromise emissions and lead to spark plug fouling, as well as degrading fuel economy. To mitigate the overly-rich air-fuel ratios, engine operation at high air flow amounts or high torques may be limited, so that the commanded amount of air may be ingested by the engine. Method 300 then returns.

Figure 4:
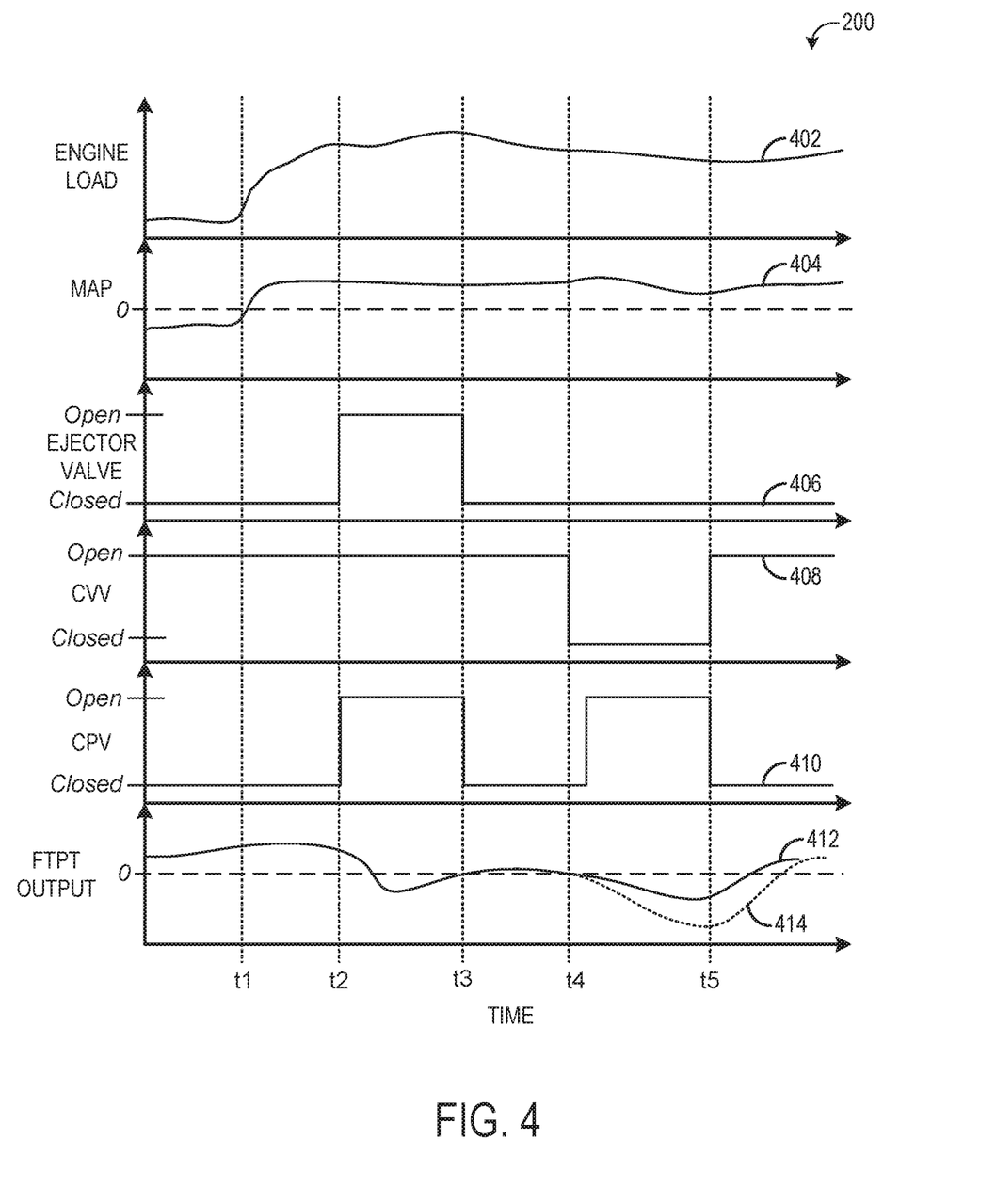
FIG. 4 is a timing diagram illustrating example operating parameters during the execution of the methods of FIGS. 3 and 4.

FIG. 4 is a timing diagram 400 showing example operating parameters that may be observed during the execution of methods 300 and 400, for example. Timing diagram 400 includes a first plot from the top illustrating engine load (shown by curve 402), a second plot from the top illustrating intake manifold pressure (MAP, shown by curve 404) relative to ambient pressure (shown by a dashed line and marked as a pressure of zero), a third plot from the top illustrating ejector flow control valve position (shown by curve 406), a fourth plot from the top illustrating canister vent valve position (shown by curve 408), a fifth plot from the top illustrating canister purge valve position (shown by curve 410), and a bottom plot illustrating fuel tank pressure transducer (FTPT) output relative to ambient pressure (shown by a dashed line and marked as a pressure of zero), with the FTPT output shown by curves 412 and 414. All plots depict time along the x-axis and values of each respective operating parameter are depicted along the y-axis.

Prior to time t1, the engine is operating in the non-boosted mode, due to low engine load (e.g., the vehicle may be idling or traveling at a low speed), as shown by curve 402. MAP is below ambient pressure, shown by curve 404, as during the non-boosted mode, the intake manifold generates a vacuum. As a result of operating in the non-boosted mode, the ejector flow control valve is closed to reduce pumping losses (as flow through the ejector to generate vacuum is not indicated), as shown by curve 406. A purge of the fuel vapor canister is not being performed, and thus the canister vent valve is open (shown by curve 408) and the canister purge valve is closed (shown by curve 410). The fuel tank may be storing some vapors, and thus the fuel tank pressure transducer output may be greater than ambient pressure, as shown by curve 412, and may remain relatively steady.

At time t1, engine load increases and the engine begins operating in the boosted mode. MAP increases and after time t1 MAP is greater than ambient pressure. No vacuum is demanded between time t1 and time t2, and thus the ejector flow control valve remains closed. No purge is performed, and thus the canister vent valve is open and the canister purge valve is closed. Fuel tank pressure remains steady.

At time t2, a purge of the fuel vapor canister is commanded, for example due to the canister load being at a purge threshold and conditions for a purge being met. To purge the canister, the ejector flow control valve is opened at time t2, thereby allowing air to recirculate through the bypass passage and the ejector. The vacuum generated by the ejector is applied to the evap system to purge the canister, by opening the canister purge valve at time t2. As a result of the purge, fuel tank pressure may decrease, temporarily being at vacuum until the pressure stabilizes at ambient pressure. (In configurations where no FTIV is present, or where the FTIV may be opened during the purge, the fuel tank is exposed to vacuum as shown. In configurations where the FTIV is closed during purge, fuel tank pressure may not change during the purge.)

At time t3, the purge is complete and the canister purge valve is closed. As no vacuum is demanded from the ejector, the ejector flow control valve is also closed. Between time t3 and t4, the engine continues to operate in the boosted mode with no vacuum demand, and the fuel vapor canister is empty due to the recent purge. Thus, an intake air filter diagnostic test is performed at time t4. To perform the diagnostic test, the ejector flow control valve is maintained closed and the canister vent valve is closed. Upon closing the canister vent valve and the ejector flow control valve, the canister purge valve is opened (e.g., just after time t4) to allow vacuum generated between the intake air filter and the compressor inlet to be applied to the evap system. While not shown in FIG. 4, if a FTIV is present between the FTPT and the fuel vapor canister, the FTIV is also open at or right after time t4, to allow the FTPT to sense evap system vacuum.

Between time t4 and t5, vacuum generated between the intake air filter and compressor inlet is measured by the FTPT. If the intake air filter is not clogged, the intake air filter presents a relatively small restriction/pressure drop in the intake air path, resulting in a relatively small amount of vacuum generation between the intake air filter and compressor inlet, as shown by the FTPT output at time t5 of curve 412. Thus, if a first, smaller amount of vacuum is measured, such as the vacuum shown by curve 412, the intake air filter is determined to be functional and not clogged. Conversely, if the air filter is clogged, the air filter presents a relatively large restriction/pressure drop in the intake air path, resulting in a relatively large amount of vacuum generation between the intake air filter and the compressor inlet, as shown by the FTPT output at time t5 of curve 414. Thus, if a second, larger amount of vacuum is measured, such as the vacuum shown by curve 414, the intake air filter is determined to be clogged. At time t5, the diagnostic test is done and the canister vent valve is opened and the canister purge valve is closed.

Thus, the methods and systems described herein provide for a boosted engine system that includes dual purge paths for purging a fuel vapor canister. The first purge path may include a direct coupling to the intake manifold of the engine that allows intake manifold vacuum to draw in fuel vapors from the fuel vapor canister to perform the purge. The second purge path may include a vacuum source (herein, an ejector) coupled across a compressor that generates vacuum from recirculation of compressed intake air through the ejector during boosted engine operation. This vacuum may be applied to the fuel vapor canister to draw vapors from the canister to the intake passage and eventually to the engine for combustion. To prevent pumping losses associated with the flow of intake air through the ejector during conditions where vacuum generation is not desired, an ejector flow control valve may be positioned between the ejector and an outlet of the compressor.

To diagnose an intake air filter, this second purge path may be utilized to fluidically couple the fuel tank pressure transducer to the intake air filter during boosted engine operation where vacuum is generated between the air filter and the inlet of the compressor. The ejector flow control valve may be closed and the canister purge valve may be opened, thereby applying the vacuum between the air filter and the compressor to the fuel vapor canister and the fuel tank pressure transducer. The output of the fuel tank pressure transducer may be monitored and compared to a threshold (e.g., amount of vacuum or rate of vacuum generation) to determine if the air filter is clogged, as a clogged air filter will result in a greater amount of vacuum being generated than a non-clogged air filter. In this way, the air filter may be diagnosed using existing engine system components.

A technical effect of diagnosing a clogged air filter using measured fuel tank pressure includes determination of a clogged air filter with existing engine system components, lowering the cost of air filter monitoring. Another technical effect is the detection of a clogged air filter before routine vehicle service is performed, allowing expedited replacement of a clogged air filter, thus improving fuel economy and reducing the likelihood of spark plug fouling.

An example provides a method for an engine coupled to an air filter and to a fuel tank. The method includes indicating air filter clogging responsive to a measured fuel tank pressure during boosted engine operation. In a first example of the method, indicating air filter clogging responsive to the measured fuel tank pressure during boosted engine operation comprises closing an ejector flow control valve positioned in a bypass passage coupled across a compressor, and opening a purge valve positioned between a fuel vapor canister and the bypass passage to expose a fuel tank pressure sensor to vacuum generated between the air filter and compressor. In a second example of the method, which optionally includes the first example, the ejector flow control valve is closed and the purge valve is opened responsive to a load on a fuel vapor canister being below a threshold load during the boosted engine operation. In a third example of the method, which optionally includes one or both of the first and second examples, the measured fuel tank pressure comprises a measurement of the vacuum generated between the air filter and the compressor, the vacuum generated between the air filter and the compressor measured by the fuel tank pressure sensor. In a fourth example of the method, which optionally includes one or more or each of the first through third examples, indicating air filter clogging responsive to the vacuum generated between the air filter and the compressor comprises indicating air filter clogging responsive to the vacuum being greater than a threshold vacuum. In a fifth example of the method, which optionally includes one or more or each of the first through fourth examples, the method further includes, responsive to a command to purge the fuel vapor canister during boosted engine operation, opening the ejector flow control valve to draw vacuum at an ejector positioned in the bypass passage and applying the drawn vacuum to purge vapors from the fuel vapor canister to an intake manifold of the engine. In a sixth example of the method, which optionally includes one or more or each of the first through fifth examples, the method further includes, responsive to indicating the air filter clogging, reducing a maximum allowed engine air flow.

An example provides for a method for a turbocharged engine, including drawing vacuum from an intake passage between an air filter and an inlet of a compressor; applying the drawn vacuum to an evaporative emissions control system; and indicating air filter clogging based a level of the drawn vacuum. In a first example of the method, applying the drawn vacuum to the evaporative emissions control system comprises opening a purge valve positioned between a fuel vapor canister and a bypass passage coupled across the compressor, and further comprising measuring the level of the drawn vacuum with a fuel tank pressure sensor positioned between the fuel vapor canister and a fuel tank. In a second example of the method, which optionally includes the first example, indicating air filter clogging based on the level of drawn vacuum comprises indicating air filter clogging based on the level of drawn vacuum being greater than a threshold level. In a third example of the method, which optionally includes one or both of the first and second examples, drawing vacuum from the intake passage comprises drawing vacuum from the intake passage during boosted engine operation when a load on the fuel vapor canister is below a threshold load. In a fourth example of the method, which optionally includes one or more or each of the first through third examples, the method further includes, in response to a fuel vapor purging event when the load on the fuel vapor canister is greater than the threshold load, drawing vacuum from an ejector positioned in the bypass passage to purge fuel vapors from the fuel vapor canister to an intake manifold of the engine. In a fifth example of the method, which optionally includes one or more or each of the first through fourth examples, the method further includes, during the boosted engine operation when the load on the fuel vapor canister is below the threshold load, closing an ejector flow control valve positioned in the bypass passage, and in response to the fuel vapor purging event when the load on the fuel vapor canister is greater than the threshold load, opening the ejector flow control valve. In a sixth example of the method, which optionally includes one or more or each of the first through fifth examples, the method further includes responsive to indicating the air filter clogging, reducing a torque limit of the engine.

An example provides for a system, including an engine; a turbocharger including a compressor positioned in an intake passage upstream of the engine; an air filter positioned in the intake passage upstream of the compressor; a bypass passage coupled across the compressor, the bypass passage including an ejector and an ejector flow control valve; an evaporative emission control system coupled to the bypass passage, the evaporative emission control system including a fuel vapor canister coupled to a fuel tank and a purge valve coupled between the fuel vapor canister and the bypass passage; and a controller storing instructions in non-transitory memory, the instructions executable by the controller to: during a first condition, open the ejector flow control valve to flow compressed intake air through the bypass passage from an inlet of the bypass passage to an outlet of the bypass passage, and open the canister purge valve to apply vacuum drawn by the ejector to the evaporative emission control system to purge vapors from the fuel vapor canister to the engine; and during a second condition, close the ejector flow control valve and open the canister purge valve to flow gasses from the evaporative emission control system through the bypass passage, from the ejector to the outlet, and indicate clogging of the air filter based on a level of vacuum in the evaporative emission control system. In a first example of the system, the first condition includes boosted engine operation with a canister load on the fuel vapor canister exceeding a purge load threshold, and wherein the second condition includes boosted engine operation with the canister load on the fuel vapor canister being below a diagnostic load threshold. In a second example of the system, which optionally includes the first example, the system further includes a conduit fluidically coupling the purge valve to an intake manifold of the engine and a check valve positioned in the conduit, and wherein the instructions are further executable to, during non-boosted engine operation with the canister load on the fuel vapor canister being above the purge load threshold, close the ejector flow control valve and open the purge valve to flow purge vapors from the fuel vapor canister to the engine via the check valve. In a third example of the system, which optionally includes one or both of the first and second examples, the system further includes a fuel tank pressure transducer coupled between the fuel tank and the fuel vapor canister, and wherein the instructions are executable to measure the level of vacuum in the evaporative emission control system with the fuel tank pressure transducer. In a fourth example of the system, which optionally includes one or more or each of the first through third examples, the instructions are executable to indicate clogging of the air filter responsive to the level of vacuum being greater than a threshold level. In a fifth example of the system, which optionally includes one or more or each of the first through fourth examples, the instructions are further executable to, upon indicating clogging of the air filter, adjust one or more engine operating parameters.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine coupled to an intake air filter and to a fuel tank, comprising:
    indicating intake air filter clogging responsive to a measured fuel tank pressure during boosted engine operation.

2. The method of claim 1, wherein indicating intake air filter clogging responsive to the measured fuel tank pressure during boosted engine operation comprises:
    closing an ejector flow control valve positioned in a bypass passage coupled across a compressor, and opening a purge valve positioned between a fuel vapor canister and the bypass passage to expose a fuel tank pressure sensor to vacuum generated between the intake air filter and compressor.

3. The method of claim 2, wherein the ejector flow control valve is closed and the purge valve is opened responsive to a load on a fuel vapor canister being below a threshold load during the boosted engine operation.

4. The method of claim 2, wherein the measured fuel tank pressure comprises a measurement of the vacuum generated between the intake air filter and the compressor, the vacuum generated between the intake air filter and the compressor measured by the fuel tank pressure sensor.

5. The method of claim 4, wherein indicating intake air filter clogging responsive to the vacuum generated between the intake air filter and the compressor comprises indicating intake air filter clogging responsive to the vacuum being greater than a threshold vacuum.

6. The method of claim 2, further comprising, responsive to a command to purge the fuel vapor canister during boosted engine operation, opening the ejector flow control valve to draw vacuum at an ejector positioned in the bypass passage and applying the drawn vacuum to purge vapors from the fuel vapor canister to an intake manifold of the engine.

7. The method of claim 1, further comprising responsive to indicating the intake air filter clogging, reducing a maximum allowed engine air flow.

8. A method for a turbocharged engine, comprising:
    drawing vacuum from an intake passage between an air filter and an inlet of a compressor;
    applying the drawn vacuum to an evaporative emissions control system; and
    indicating air filter clogging based a level of the drawn vacuum measured in the evaporative emissions control system.

9. The method of claim 8, wherein applying the drawn vacuum to the evaporative emissions control system comprises opening a purge valve positioned between a fuel vapor canister and a bypass passage coupled across the compressor, and further comprising measuring the level of the drawn vacuum with a fuel tank pressure sensor positioned between the fuel vapor canister and a fuel tank.

10. The method of claim 9, wherein indicating air filter clogging based on the level of drawn vacuum comprises indicating air filter clogging based on the level of drawn vacuum being greater than a threshold level.

11. The method of claim 10, wherein drawing vacuum from the intake passage comprises drawing vacuum from the intake passage during boosted engine operation when a load on the fuel vapor canister is below a threshold load.

12. The method of claim 11, further comprising, in response to a fuel vapor purging event when the load on the fuel vapor canister is greater than the threshold load, drawing vacuum from an ejector positioned in the bypass passage to purge fuel vapors from the fuel vapor canister to an intake manifold of the engine.

13. The method of claim 12, further comprising during the boosted engine operation when the load on the fuel vapor canister is below the threshold load, closing an ejector flow control valve positioned in the bypass passage, and in response to the fuel vapor purging event when the load on the fuel vapor canister is greater than the threshold load, opening the ejector flow control valve.

14. The method of claim 8, further comprising responsive to indicating the air filter clogging, reducing a torque limit of the engine.

15. A system, comprising:
an engine;
a turbocharger including a compressor positioned in an intake passage upstream of the engine;
an air filter positioned in the intake passage upstream of the compressor;
a bypass passage coupled across the compressor, the bypass passage including an ejector and an ejector flow control valve;
an evaporative emission control system coupled to the bypass passage, the evaporative emission control system including a fuel vapor canister coupled to a fuel tank and a purge valve coupled between the fuel vapor canister and the bypass passage; and
a controller storing instructions in non-transitory memory, the instructions executable by the controller to:
during a first condition, open the ejector flow control valve to flow compressed intake air through the bypass passage from an inlet of the bypass passage to an outlet of the bypass passage, and open the canister purge valve to apply vacuum drawn by the ejector to the evaporative emission control system to purge vapors from the fuel vapor canister to the engine; and
during a second condition, close the ejector flow control valve and open the canister purge valve to flow gasses from the evaporative emission control system through the bypass passage, from the ejector to the outlet, and indicate clogging of the air filter based on a level of vacuum in the evaporative emission control system.

16. The system of claim 15, wherein the first condition includes boosted engine operation with a canister load on the fuel vapor canister exceeding a purge load threshold, and wherein the second condition includes boosted engine operation with the canister load on the fuel vapor canister being below a diagnostic load threshold.

17. The system of claim 16, further comprising a conduit fluidically coupling the purge valve to an intake manifold of the engine and a check valve positioned in the conduit, and wherein the instructions are further executable to, during non-boosted engine operation with the canister load on the fuel vapor canister being above the purge load threshold, close the ejector flow control valve and open the purge valve to flow purge vapors from the fuel vapor canister to the engine via the check valve.

18. The system of claim 15, further comprising a fuel tank pressure transducer coupled between the fuel tank and the fuel vapor canister, and wherein the instructions are executable to measure the level of vacuum in the evaporative emission control system with the fuel tank pressure transducer.

19. The system of claim 18, wherein the instructions are executable to indicate clogging of the air filter responsive to the level of vacuum being greater than a threshold level.

20. The system of claim 15, wherein the instructions are further executable to, upon indicating clogging of the air filter, adjust one or more engine operating parameters.

* * * * *